June 5, 1934.　　　A. O. ABBOTT, JR　　　1,961,725
APPARATUS FOR MANUFACTURING TIRES
Filed July 30, 1927　　　11 Sheets-Sheet 1
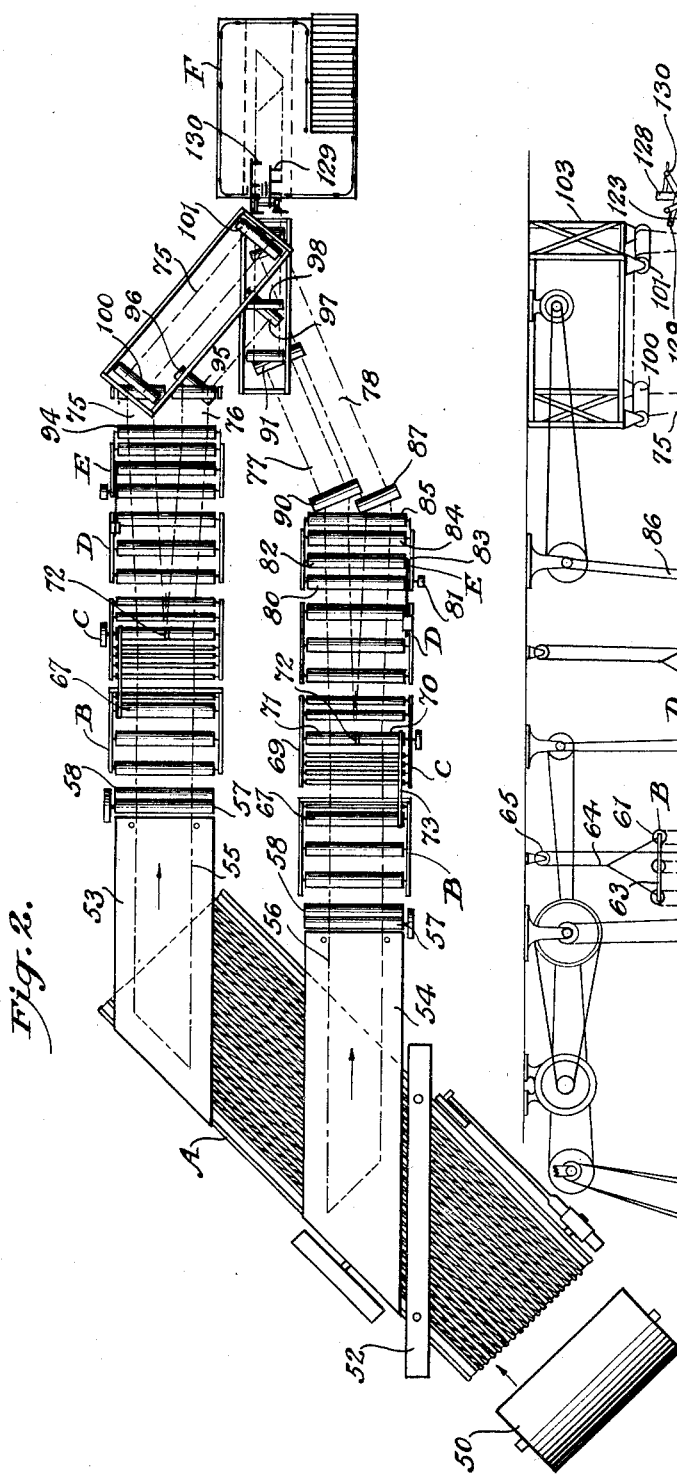
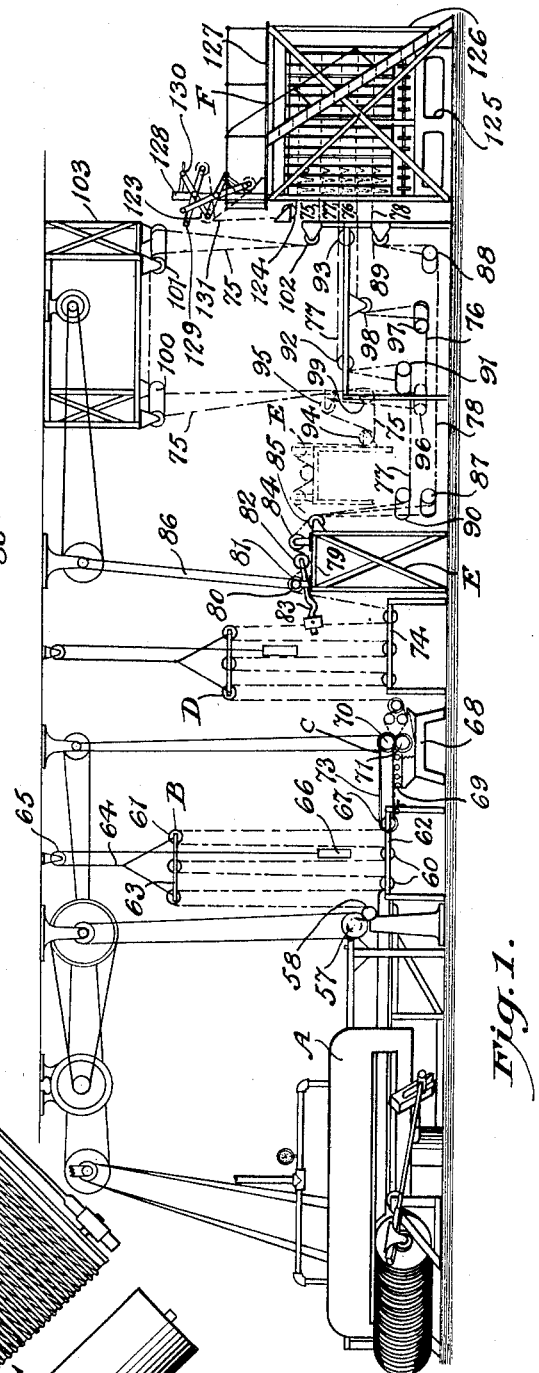
INVENTOR
Adrian O. Abbott, Jr.
BY
ATTORNEY

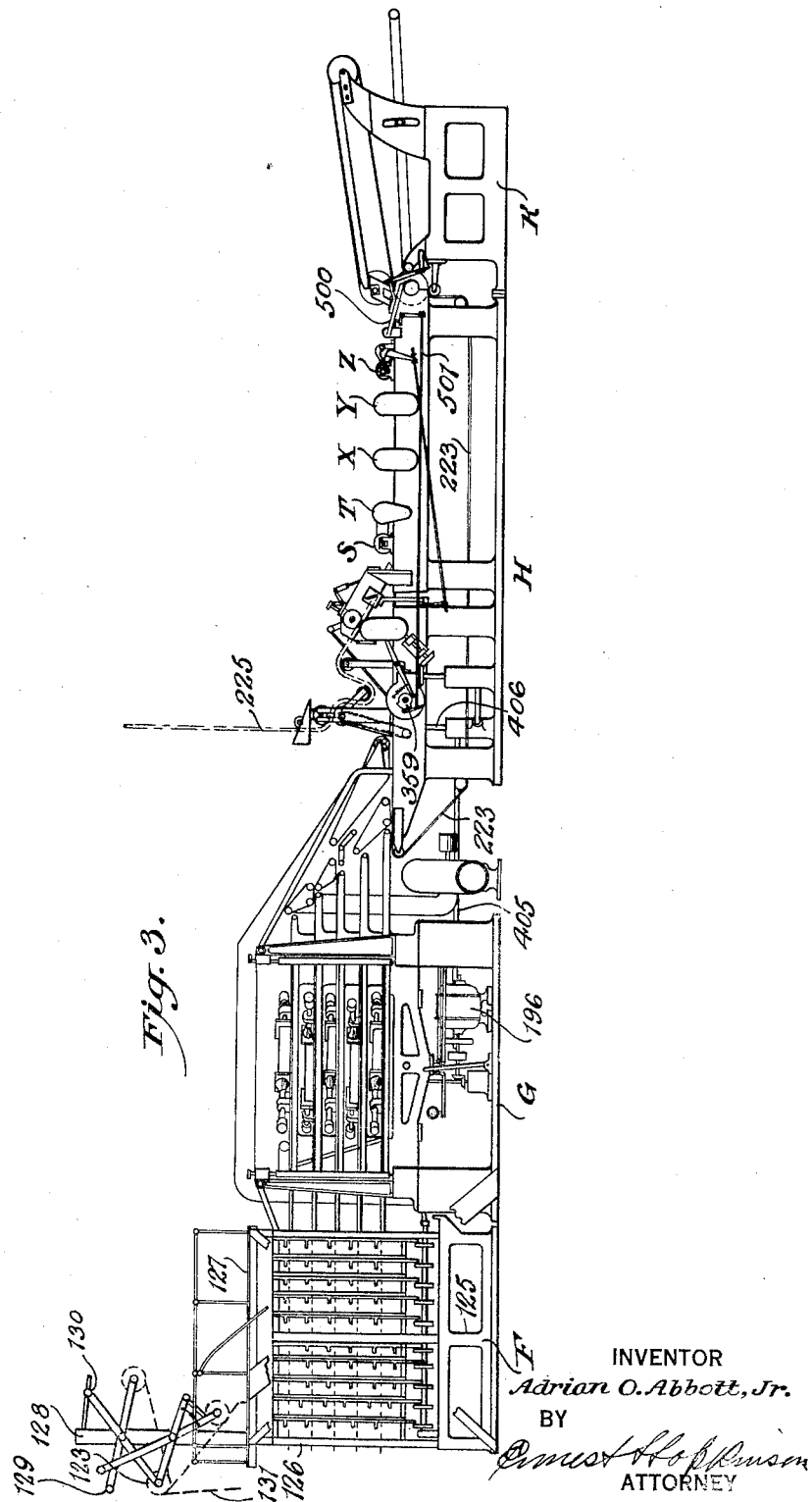

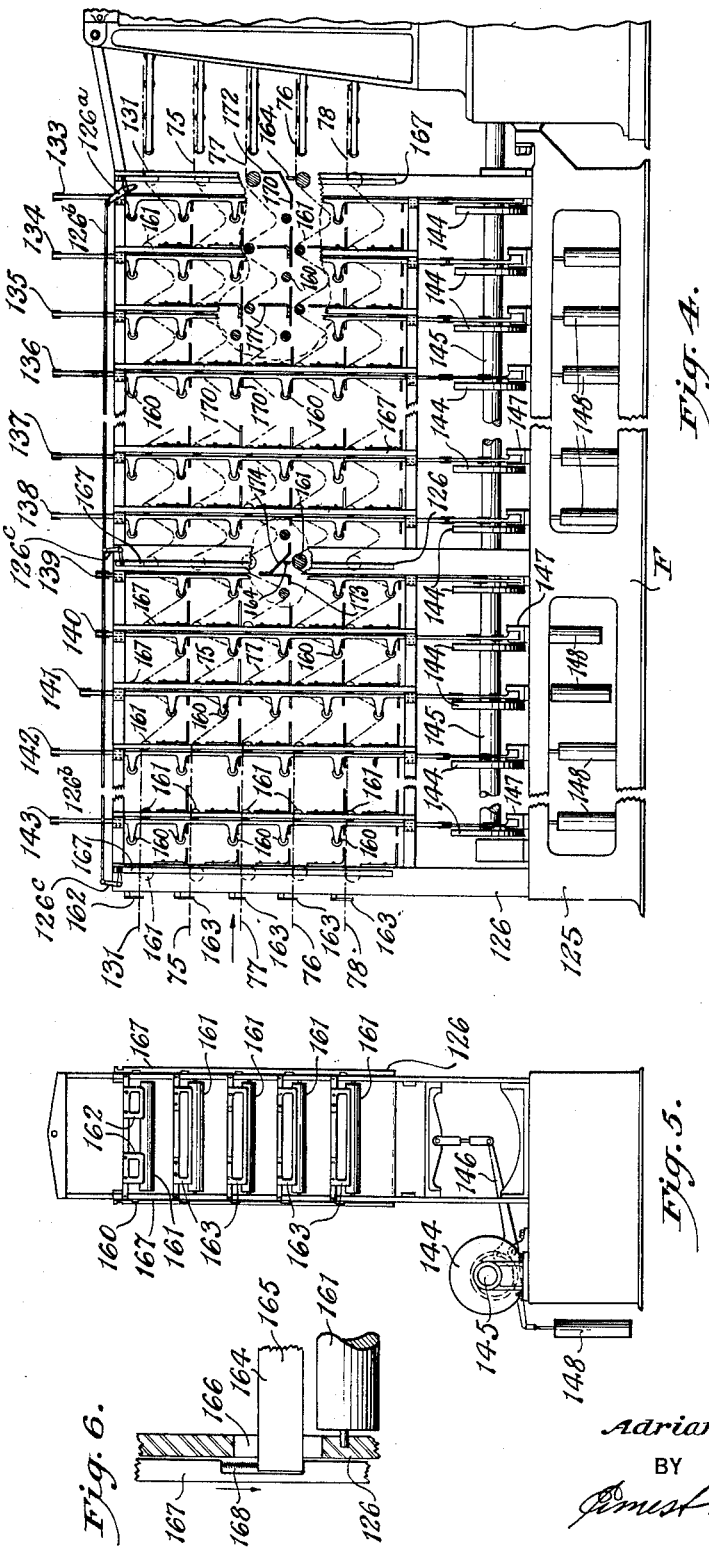

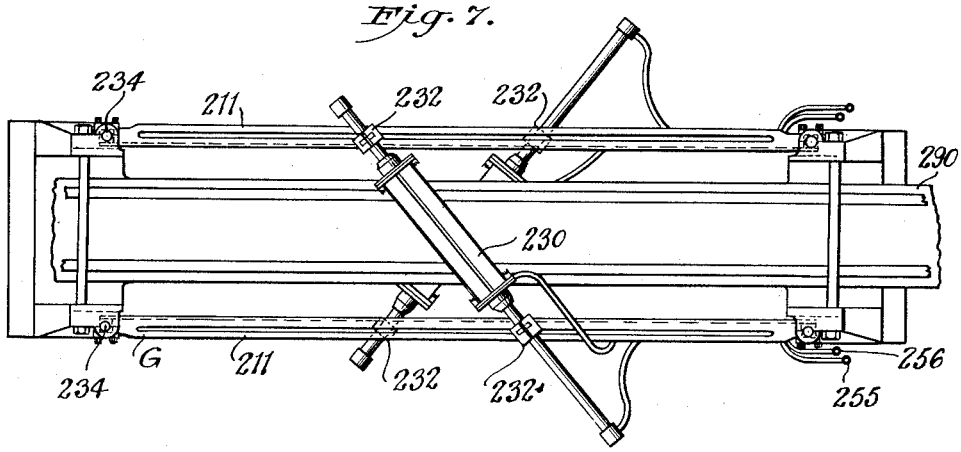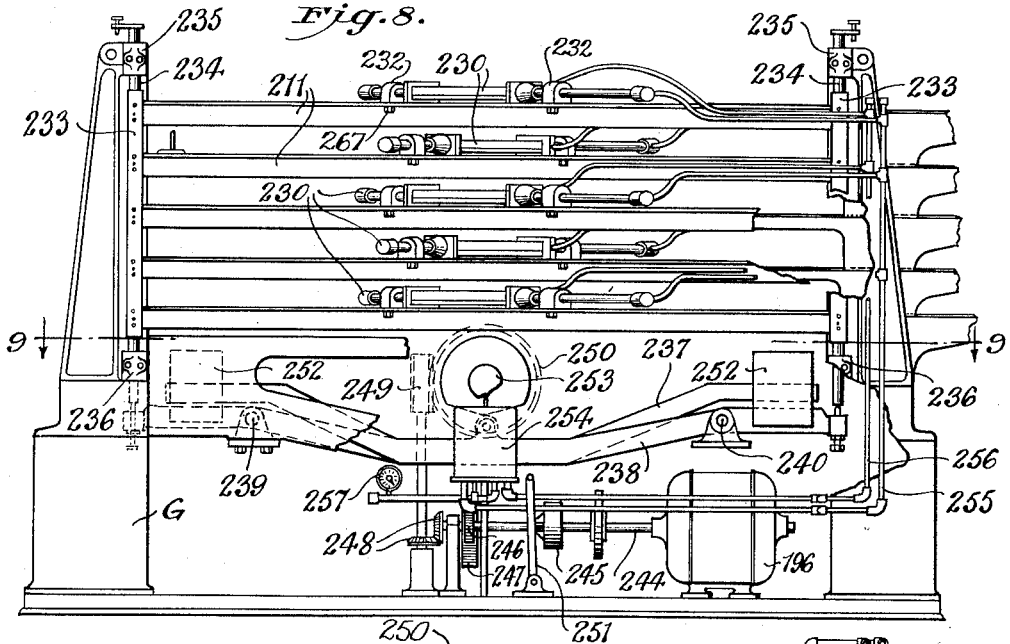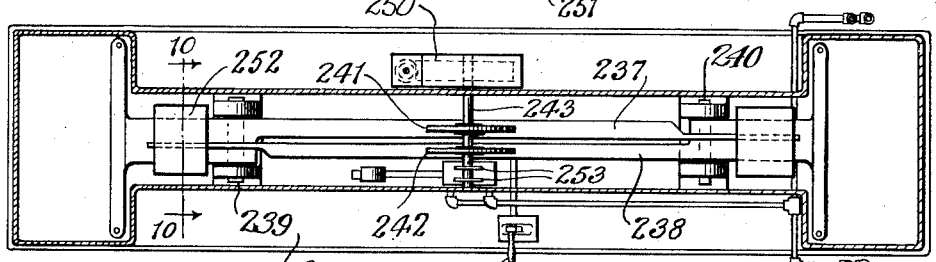

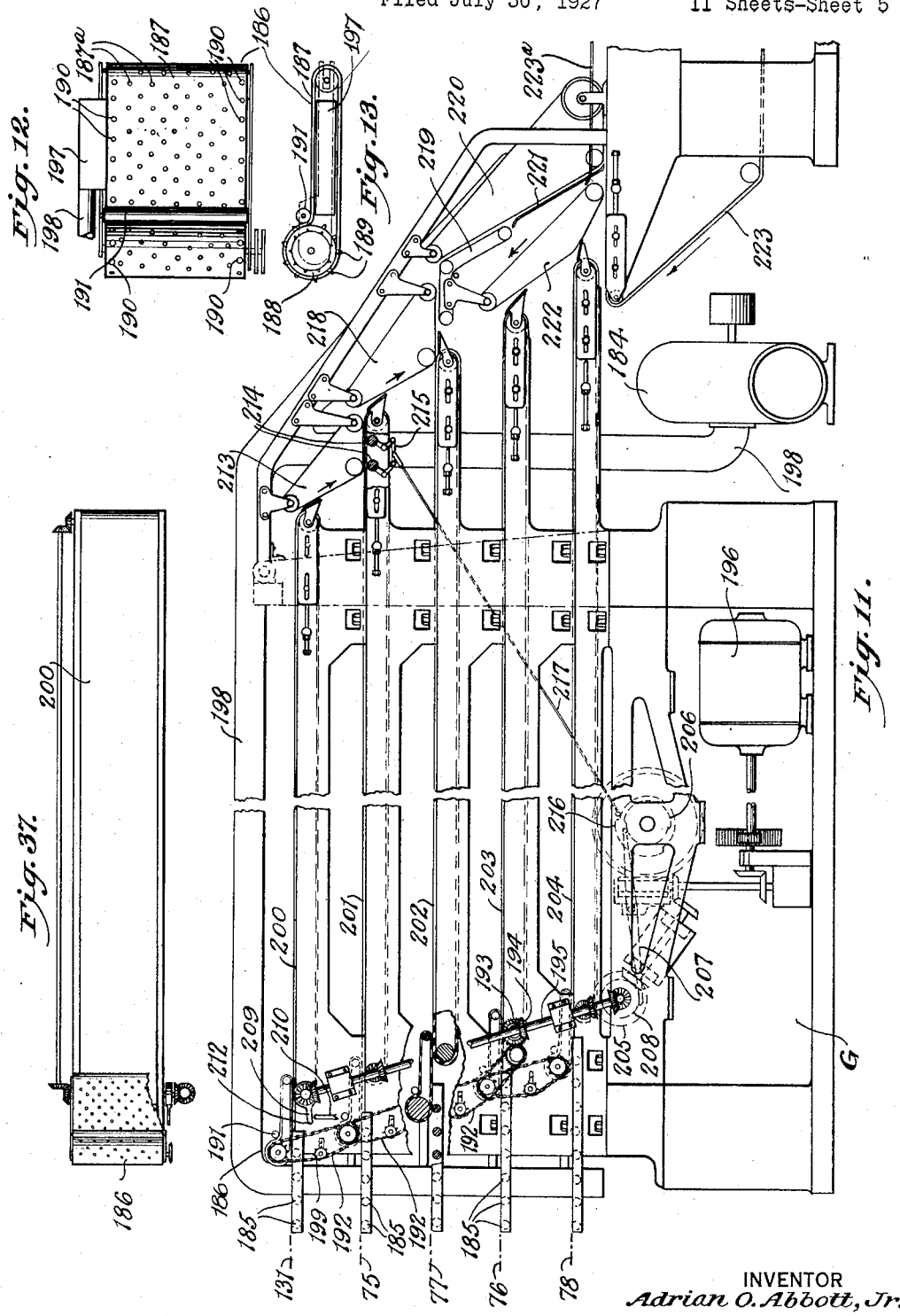

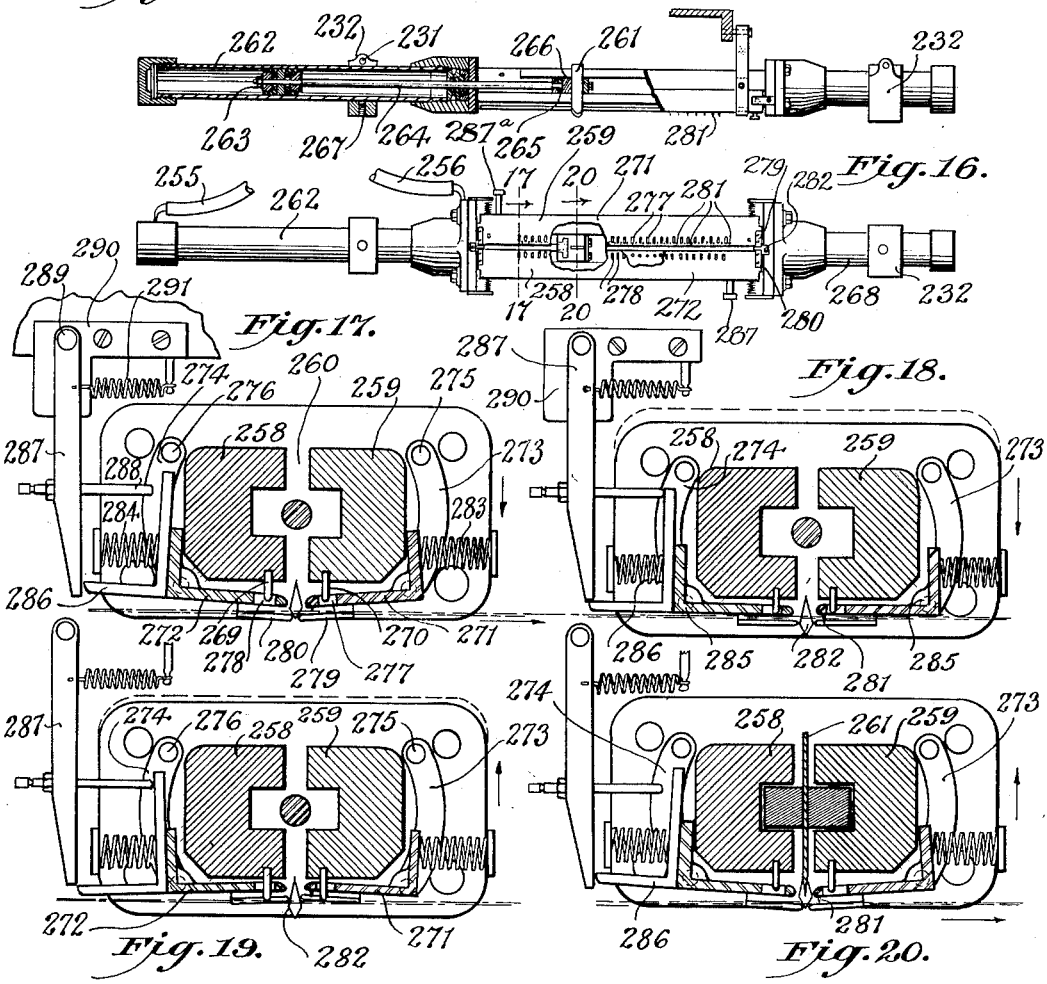

June 5, 1934. A. O. ABBOTT, JR 1,961,725
APPARATUS FOR MANUFACTURING TIRES
Filed July 30, 1927   11 Sheets-Sheet 7
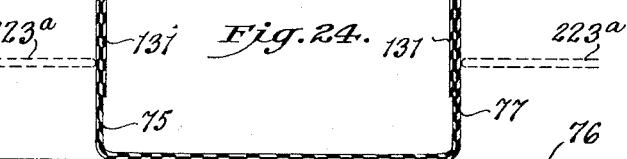
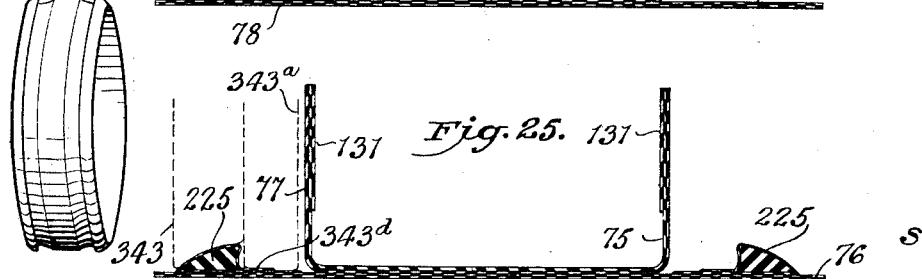
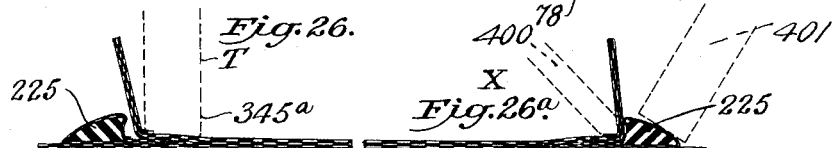
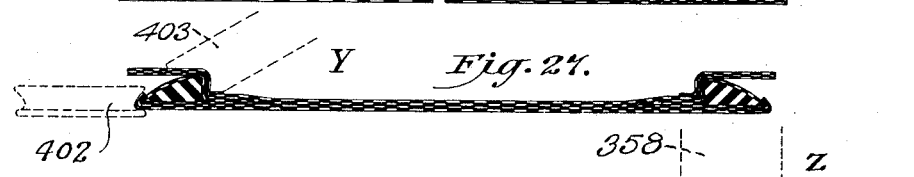
INVENTOR
Adrian O. Abbott, Jr.
BY
ATTORNEY

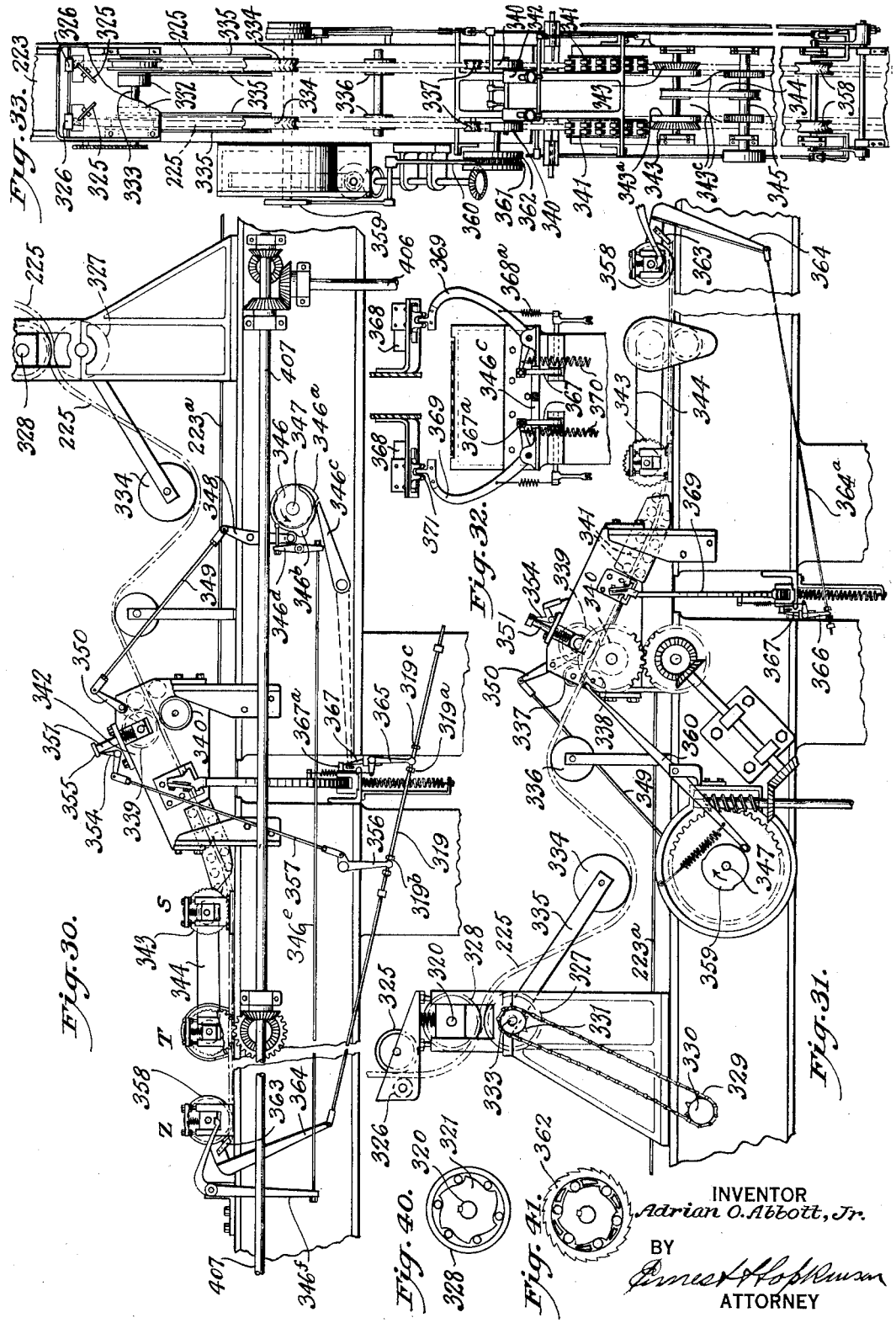

June 5, 1934.   A. O. ABBOTT, JR   1,961,725
APPARATUS FOR MANUFACTURING TIRES
Filed July 30, 1927   11 Sheets-Sheet 9
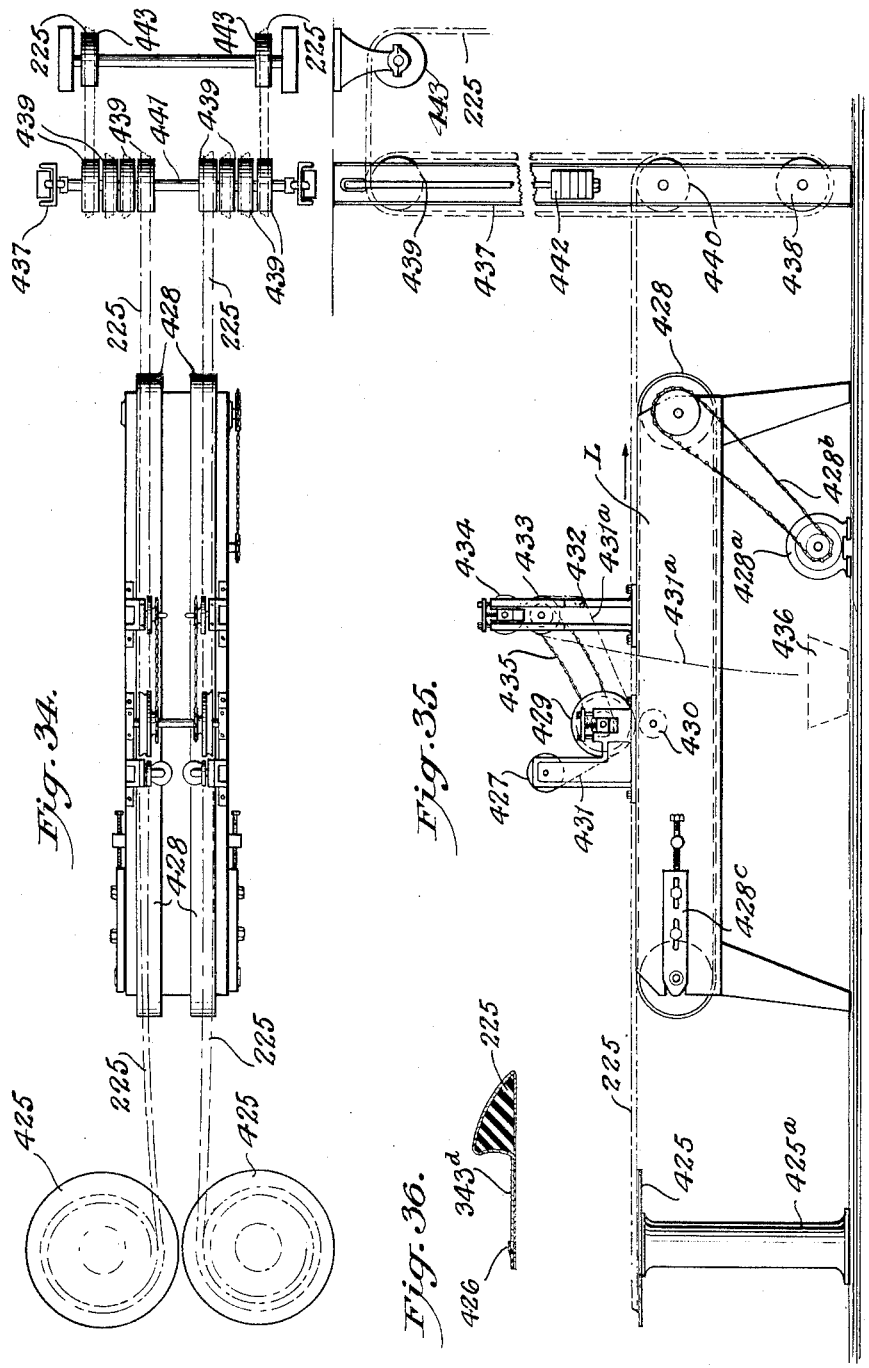
INVENTOR
Adrian O. Abbott, Jr.
BY
ATTORNEY

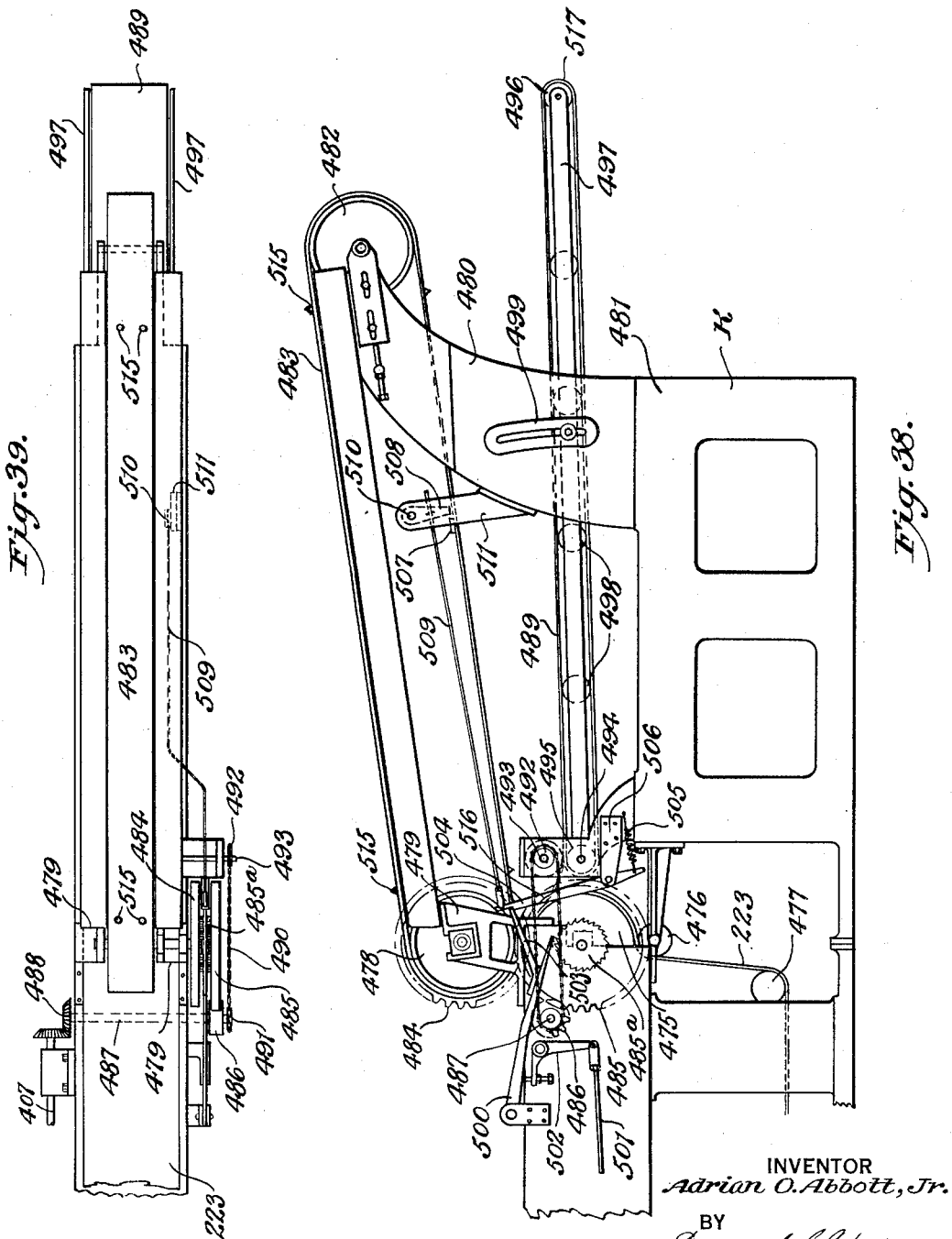

June 5, 1934.  A. O. ABBOTT, JR  1,961,725
APPARATUS FOR MANUFACTURING TIRES
Filed July 30, 1927  11 Sheets-Sheet 11
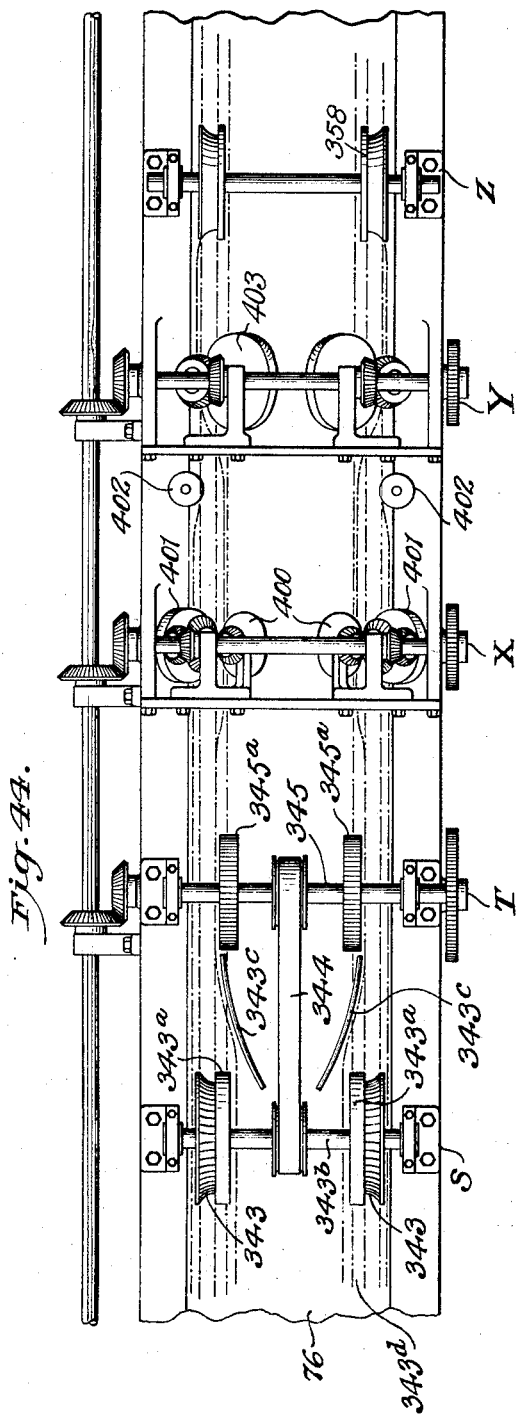
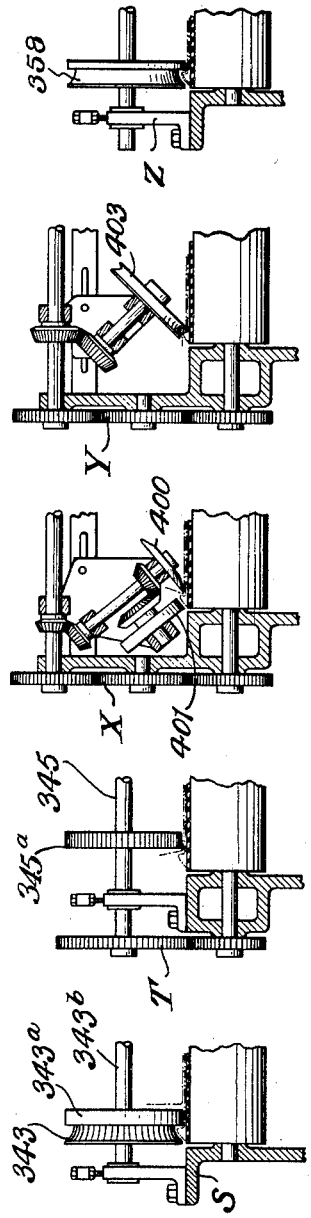
INVENTOR
Adrian O. Abbott, Jr.
BY
ATTORNEY Patented June 5, 1934

1,961,725

UNITED STATES PATENT OFFICE 1,961,725

APPARATUS FOR MANUFACTURING TIRES

Adrian O. Abbott, Jr., Grosse Pointe Park, Mich., assignor to Morgan & Wright, Detroit, Mich., a corporation of Michigan Application July 30, 1927, Serial No. 209,564

45 Claims. (Cl. 154—10)

This invention relates to the manufacture of pneumatic tires for vehicles but more particularly to an improved machine or apparatus for building such tires, and has for its primary object to reduce the cost of production and provide a superior tire.

Pneumatic tires are now quite generally built by what is known as the flat building method in which the elements are usually assembled manually on a cylinder or drum and the so-called "pulley band" thus formed is expanded or otherwise brought to tire shape in various ways such as the well known vacuum method. This flat building method has proven of great value in the industry but the amount of manual labor involved has very materially contributed to the cost of the tire.

Instead of assembling the elements of the tire upon a drum in the manner described, the present invention provides for the building of the tire in the form of a flat slab which preferably includes all the necessary elements. This slab is brought to "pulley band" form by merely splicing the ends. While this method may be performed manually, I have devised a machine which builds the slab practically automatically. The particular embodiment of my invention which I have selected to illustrate the principles involved is primarily intended for the building of clincher tires, but it will be appreciated that the same may be readily modified for use in the building of straight side tires. The stock is fed to the machine, bias cut, the plies assembled or superimposed and cut to length, and the chafing strips, breaker, beads and tread applied so that when the slab is discharged from the machine it is ready to be spliced into "pulley band" form. This effects a very material saving in labor, and greatly reduces the cost of the tire. This machine further eliminates many of the irregularities which are characteristic of the manually built article and which are due mainly to lack of precision on the part of the human element employed, thus producing a superior product.

The many other objects and advantages of the invention will be better understood by reference to the following specification when considered in connection with the accompanying drawings, in which:

Fig. 1 is a diagrammatic elevation of the portion of the machine which prepares the cord fabric for the plying operation.

Fig. 2, same as Fig. 1, plan view.

Fig. 3, a diagrammatical elevation of the portion of the mechanism which assembles the slab of stock.

Fig. 4, an elevation of the take-up unit which prepares the stock to enter the plying mechanism with all tension and stretch removed.

Fig. 5, same as Fig. 4, end view.

Fig. 6, detail view.

Fig. 7, top plan view of the stock cutting mechanism, elevating device, and conveyor.

Fig. 8, same as Fig. 7, side elevation, portions being broken away to show the elevating mechanism which raises and lowers the cutting device to and from the fabric.

Fig. 9, section on the line 9—9 of Fig. 8.

Fig. 10, detail section on the line 10—10 of Fig. 9.

Fig. 11, side elevation of the mechanism shown in Fig. 7.

Figs. 12 and 13, detail views.

Fig. 14, detail perspective view of a portion of the cutting mechanism showing the relative position of same to the conveyor.

Fig. 15, detail view partly in section of the cutting device.

Fig. 16, same as Fig. 15, bottom plan view.

Figs. 17–20 inclusive, detail views in section showing different positions of the cutting device.

Fig. 21, detail view showing an adjustment on the bottom of the cutting device for stocks of different thickness.

Figs. 22–29 inclusive, diagrammatic views illustrating the steps of the tire building.

Fig. 30, partial side elevation of the bead cutting and applying mechanism.

Fig. 31, same as Fig. 30, opposite side.

Fig. 32, detail view of the bead cutter.

Fig. 33, top plan view of mechanism shown in Fig. 30.

Fig. 34, top plan view of the mechanism that applies a gum strip to the edge of the flipper strip on the bead.

Fig. 35, same as Fig. 34, side elevation.

Fig. 36, detail view showing transverse section of a bead and gum strip.

Fig. 37, top plan view of the conveyor and cutting tables for the stock shown in Fig. 1.

Fig. 38, side elevation of the mechanism for applying the tread stock to the built up plies.

Fig. 39, same as Fig. 38, plan view.

Figs. 40 and 41 are detail views of non-return clutches for the bead supplying apparatus.

Fig. 42 shows a completed slab.

Fig. 43 shows a completed pulley band.

Fig. 44, partial plan view of the bead cutting and applying mechanism.

Figs. 45-49 inclusive, detail views, bead cutting and applying mechanism.

The embodiment of the invention shown in the drawings consists of a plurality of cooperating units which successively operate on the cord fabric to completely build the flat slab. An advantageous arrangement of these units is illustrated in Figs. 1-3 inclusive, although it will be appreciated that this arrangement may be varied materially without altering the operation. This particular machine is designed to build a clincher tire consisting of four plies of cord fabric, chafing strips, a breaker, beads and a tread. The principles involved are the same where more or less plies are to be used.

The units in the present embodiment in the order of their operation are as follows: Bias cutting machine A, take-up mechanisms B, the slitting machines C, the take-up mechanisms D, the receiving mechanism E, the tension relieving mechanism F, the measuring and cutting mechanism G, the bead cutting and applying mechanism H, and the tread and breaker applying mechanism K.

Referring particularly to Figs. 1 and 2, the cord fabric in the form of a roll as 50 is fed to a bias cutting machine A, where it is cut into strips in the usual manner by passing under a knife as 52. Any suitable bias cutting machine may be used or the fabric may be cut manually, but I prefer to use either the machine forming the subject matter of U. S. Patent No. 1,497,765 granted to me June 17, 1924 or that disclosed in my U. S. Patent No. 1,658,181, granted February 7, 1928 and reference may be had thereto for details of construction and mode of operation. The cut lengths of fabric are then alternately placed upon parallel tables 53 and 54 by operators and there spliced into continuous strips as 55 and 56, the strip on table 54 being inverted as indicated in dot and dash lines. This inversion of the fabric may be made automatically by the machine as the fabric is being arranged in superposed relation.

The spliced strips of fabric 55 and 56 are drawn from their respective tables by means of driven rolls 57 and 58 to take-up mechanism B. This take-up mechanism may be of any suitable type but in the present embodiment consists of lower rolls 60 and upper rolls 61. The lower rolls are supported upon a suitable frame as 62 while the upper rolls are mounted in a frame as 63 suspended by a cord 64 passing over a pulley 65 and attached to a counterweight as 66. The fabric passes alternately under and over the rolls of the frames 62 and 63 respectively. It is advisable to have the fabric fed to the slitting device continuously, and in view of the fact that the stock leaves the splicing tables intermittently it is necessary or advisable to provide some form of take-up device to compensate for the varying speeds. The take-up device B automatically performs this function in a satisfactory manner.

The strips 55 and 56 are drawn from their respective take-up mechanisms by a roll as 67 and delivered to slitting machines C. Any suitable mechanism for longitudinally dividing or slitting the strip may be used but in the present embodiment the fabric is fed over a series of guide rolls 69 to rolls 70 and 71 provided with coacting cutting discs 72 between which the strip passes. The rolls 70 and 71 are preferably geared together and the feed roll 67 is driven by the roll 70 through a belt 73.

In rear of the slitting devices are preferably provided take-up mechanisms D similar in character to the mechanisms B. This mechanism D is provided to compensate for the intermittent withdrawal of the strips from the slitting mechanism C which preferably operates continuously. Each of the spliced strips 55 and 56 has now been divided into two strips of the desired width, and for the purpose of following these strips through the mechanisms, they are numbered 75, 76, 77 and 78.

These strips now pass from the take-up mechanisms D to corresponding receiving mechanisms E which operate to advance them toward tension relieving mechanism F. In the present embodiment each of these receiving mechanisms includes a driven roll 80, a clutch 81, a clutch operating roll 82, a counterweighted lever 83 connecting the roll 82 with the clutch 81, and guide rolls 84 and 85. As the tension on the strip increases the roll 82 is lifted by this strip and this causes the lever 83 to engage the clutch 81 so that the roll 80 is driven by the belt 86. When the roll 80 feeds the strip more rapidly than it is required by the tension relieving mechanism F, the tension is released on the strip and this permits the roll 82 to drop and to thus disengage the roll 80 from the operating mechanism.

After leaving the roll 85, the strip 78 passes downwardly under the guide rolls 87 and 88 and then over the roll 89 to the tension relieving mechanism F. Similarly the strip 77 passes under the rolls 90 and 91 and then over the rolls 92 and 93 to the mechanism F. The receiving mechanism E for the strips 75 and 76 is substantially the same as that for the strips 77 and 78 already described except that the final roll 94 corresponding to the roll 85 is depressed. The strip 76 on leaving the receiving mechanism passes under this roll 94 over the roll 95 under the rolls 96 and 97 and over the roll 98 to the mechanism F. The strip 75 passes under the rolls 94 and 99, over the rolls 100 and 101 and under the roll 102 to the mechanism F. The rolls 100 and 101 are in the present embodiment suspended on a frame 103. The strips thus are laterally shifted and enter the mechanism F in superimposed relation in the following order beginning at the top, 75, 77, 76 and 78.

*The tension relieving mechanism*

The primary function of the tension relieving mechanism F (Figs. 4-6) is to prepare the stock for the measuring and cutting mechanism G. This mechanism F receives the strips from the mechanisms E in superimposed and spaced relation. When the strips 55 and 56 were placed upon the tables 53 and 54 respectively, one of the strips was inverted so that the cords in these two strips extended in different directions in the manner indicated in Fig. 1. Therefore when the plies reached the mechanism F the cords in alternate strips extend in the same manner as is usual in the building of tires.

The mechanism is provided with a base 125 on which is the main frame 126. At the top of the frame 126 is preferably provided a platform 127 for the convenience of the operator, and chafing strip loaders 128 of any suitable type are preferably mounted on this platform. The loader illustrated consists of two sets of pins 129 and 130, the chafing strip stock being on one set of pins while the other set is discharged into the machine. The chafing strips are designated 131 and these enter the mechanism F through guides 162 above the uppermost ply or strip 75 in the manner indicated in Fig. 1. The chafing strip stock is drawn from the supply roll 123 and passes under the guide roll 124.

A series of frames 133–143 inclusive are slidable vertically in frame 126 and these are actuated by corresponding cams 144 on the shaft 145. Each of these sliding frames is connected to an operating lever 146 which is fulcrumed on one of the bearings 147. The cams 144 coact with their respective levers 146 to cause the sliding frames to be reciprocated in a vertical plane. A counterweight 148 is attached to the outer end of each of the levers 146 to balance the corresponding frame and facilitate the reciprocation of the same by the operating cam.

On each of the sliding frames 133—143 inclusive is mounted a series of rolls 160. Corresponding rolls 161 are mounted in the fixed frame 126 so that each strip passes alternately over a fixed roll 161 and under a movable roll 160. Plates 162 (Figs. 4 and 5) form guides for the chafing strips and similarly plates 163 guide the plies as they enter the mechanism F in the manner indicated in Fig. 4. The cams 144 are preferably so mounted on the shaft 145 that the sliding frames 133—138 are lowered one at a time beginning with 133. When depressed these frames remain in their lowermost position until the frame 138 has reached this position and then all rise together, leaving a series of festoons as shown by dotted lines in the right half of Fig. 4. In the left half of this figure the frames 139 and 140 are shown in their lowermost position and the frame 141 is in course of being lowered. The frames 142 and 143 are still in their uppermost position. As in the right half of the figure, all of the frames 139—143 will rise as soon as the last frame 143 has been lowered. The downward movement of the rolls 160 draws the cloth between the rolls 161 and forms the festoons, and the return of these rolls 160 leaves the festoons suspended from the rolls 161. In order to prevent the cloth being drawn rearwardly and thus eliminating the already formed festoons, a brake mechanism as 164 (Figs. 4 and 6) is preferably provided at the center and both ends of the frame 126. In the present embodiment this brake mechanism consists of a brake bar 165 disposed parallel with the corresponding fixed roller 161 and extending, at its ends, into recesses in frame 167 (see Fig. 6) which is slidably mounted on frame 126. The brake bar 165 is slidable vertically in slots 166 in the oppositely disposed members of the frame 126. The frames 167 are vertically slidable and actuated by lever 126a in turn operated by sliding frame 133. Connections are made to the other frames 167 by rod 126b through bell cranks 126c which are reversed so that the brakes alternate their action in accordance with the cloth being festooned. Springs 168 act between the frame members 167 and the brake bars 165 to equalize the pressure on the stock at the various stations. Plates 170, 171, 172, 173 and 174 are preferably provided to prevent the stock of adjoining festoons from coming in contact. When the strips or plies leave the mechanism F, all tension has been removed therefrom. The strips are drawn from the tension relieving device by the feed mechanism of the measuring and cutting mechanism G.

*The measuring and cutting mechanism*

The plies 75–78 inclusive in the superimposed arrangement already described pass from the mechanism F to the measuring and cutting mechanism G over corresponding guide rolls 185 and are drawn forwardly intermittently by means of vacuum feed mechanisms as 186, (Figs. 12, 13 and 37), one being disposed above the chafing strips and each of the plies. These vacuum mechanisms consist of a suction belt as 187 running over a vacuum box as 197. The belt is driven by a roll 188 having a series of teeth 189 which enter corresponding perforations 190 in the margins of the belt. A roll 191 causes the belt to follow the contour of the roll 188 for a considerable distance. The rolls 188 are actuated by a series of chains 192 driven by the gear 193 meshing with the gear 194 on the drive shaft 195 (Fig. 11). This shaft 195 is operated by suitable gearing from a source of power supply as the motor 196. The vacuum box 197 (Figs. 12 and 13) lies within the loop of the belt 187 and causes a suction through the perforations 187a in this belt. The box 197 is connected to a low pressure vacuum system as 184 (Fig. 11) through the suction pipe 198. Sprockets 199 take up slack in the chains 192.

A series of conveyor belts 200, 201, 202, 203, and 204 extend longitudinally of the frame of the mechanism G and these are driven by the shaft 195 from the motor 196. A clutch 205 actuates the shaft 195 and this is controlled by a cam 206 through pawl 207 and ratchet 208 to provide the intermittent feed. The conveyor 200 carries the chafing strips and it is necessary or advisable that these strips be longer than the plies of tire stock to permit lapping. In order to provide this extra length, a one way clutch 209 is provided, and a pin 210 erected from one of the side rails 211 raises an arm 212 on the clutch 209 when the elevating mechanism for the cutters operates in the manner which will be presently described. This movement of the arm 212 rotates the clutch and therefore advances the conveyor a sufficient distance to fulfill the requirements, for example about ½". A vacuum feed mechanism 213 (Fig. 11) similar in character to the mechanism 186 carries the chafing strips 131 down to the conveyor 201 near the end of which are located two stitching rolls 214 underneath the conveyor belt. These rolls are mounted on rocker arms 215 actuated by a cam 216 on the same shaft as the cam 206. The cam 216 rocks the rolls 214 through the medium of a rod 217 so that when the chafing strips 131 are brought into contact with the ply 75 on the conveyor 201 the strips are stitched thereto. Ply 75 with chafing strips 131 attached to the marginal portions thereof is next carried downwardly by a vacuum mechanism 218 and stitched to the ply 77 as indicated in Fig. 22. This assembly is then carried forward by belt 219 to vacuum mechanism 220 and thence downwardly on the guide 221 as indicated.

Ply 76 is advanced by the conveyor 203 until it is engaged by the vacuum feed mechanism 222 and then carried downwardly by this mechanism and applied to the upper face of the ply 78. The assembled plies 76 and 78 (see Fig. 23) are then carried by the box 222 and stitched to the assembly 131, 75 and 77 on the main conveyor belt 223. The assembly 131, 75 and 77 has the marginal portions thereof preferably turned up, as shown in Fig. 24, by oppositely disposed guides 223a, to allow the beads 225 to be inserted in the manner indicated in Fig. 25 at a distance approximately ⅜ of an inch from the margins of the assembly plies 76 and 78.

While the plies and chafing strips are upon the conveyor belts 200—204 inclusive, they are cut into the desired lengths for the particular tires being manufactured. The cutting mechanism consists of a series of cutting units 230 (Figs. 7, 8, 9 and 14–16) one being disposed above each of these conveyor belts. These units are supported on vertically movable side rails 211 by means of bearings 232 which are adjustable longitudinally of the rails to enable the position of the cutting unit to be varied for different tire sizes. The rails 211 are connected by upright members 233, making a uniform frame on each side of the conveyor belts. These frames are attached to shafts 234 which are vertically slidable in bearings 235—236 to enable the cutting units to be raised to allow the stock to pass thereunder and then lowered into cutting position. The raising of the frames is accomplished by levers 237 and 238 respectively fulcrumed at 239 and 240. These levers are respectively operated by cams 241 and 242 mounted on the shaft 243. This shaft is driven from the motor 196 through the medium of shaft 244, clutch 245, gears 246 and 247, gears 248, worm 249, and gear 250. Manually operated lever 251 controls the clutch 245. The cutting units are depressed by gravity, counterweights 252 being provided to assist the cam action in the raising of the units. Cams 253 on the shaft 243 operate an air valve mechanism 254 which controls the action of the cutters 230 through the air lines 255 and 256. A gauge 257 is preferably provided to indicate the air pressure.

The cutting units 230 are alike in construction and mode of operation except that alternate units are set at different oblique angles substantially in the manner indicated in Fig. 7. Only one of these units (Figs. 14–21) and its mode of operation will be described in detail as the same will apply to each of the other units. This cutting unit comprises parallel members 258 and 259 spaced sufficiently to provide a slot 260 through which the cutting blade 261 moves longitudinally of these members to sever the strips or ply. At one end of these members 258 and 259 is secured a cylinder 262 in which operates a piston 263 mounted on the piston rod 264. The end of this rod 264 opposite from the piston 263 is attached to a socket 265 which in turn fits into a socket 266 in which is mounted the cutting blade 261. One of the bearings 232 fits about the cylinder and such cylinder is secured in position therein by a clamping screw 231 or other suitable means and the assembly is fixed on frame 211 by a clamping screw 267. At the opposite end of the members 258 and 259 is attached a supporting arm 268 which passes through the corresponding bearing 232. The cutting blade is reciprocated longitudinally in the slot 260 by admitting air alternately to the cylinder through the lines 255 and 256, the line 256 exhausting while air is entering through 255 and vice versa.

Stripper pins 269 are seated in the under face of the member 258 and similar pins 270 are provided on the member 259. Angle plates 271 and 272 are mounted on swinging arms 273 and 274 which are respectively pivoted at 275 and 276, and these plates are provided with apertures 277 and 278 to permit the passage therethrough of the stripper pins 269 and 270. Plates 279 and 280 are respectively attached to the opposing margins of the plates 271 and 272 respectively. Plate 271 is provided with pins 281 which are adapted to grip the stock in a manner which will be presently described. A cam 282 is interposed between the edges of the plates 279 and 280. Springs 283 and 284 act between the upright portions of the plates 271 and 272 to normally press these portions inwardly and thus depress the inner ends of the horizontal portions of such plates. This is permitted by a pivotal connection as at 285 between the plates and their corresponding supporting arms. An angle plate 286 is provided on the plate 272 and an arm 287 is adapted to engage this plate to hold the plate 272 in place for a short period until it is released by a pin 288. The arm 287 is pivotally mounted at 289 on the frame member 290 and is drawn inwardly by spring 291.

The operation of the cutting unit is illustrated in detail in Figs. 17–20. Fig. 17 shows the position of the parts when the cutter is above the stock and ready to descend for the cutting operation. As the unit is lowered in the manner described, the inner marginal portions of the plates 271 and 272 come in contact with the stock and grip the same on opposite sides of the lines of cut, the pins 281 on the plate 271 being forced into the stock. As the downward movement continues the cam 282 spreads these angle plates through the medium of the plates 279 and 280 attached thereto which engage the wedge shaped upper portion of the cam. This brings the stock under tension in the path of the cutter. Only the inner marginal portion of the angle plate 272 bears upon the stock. At this point the arm 287 has slipped over the plate 286, preventing the plate 272 from going back at once. A similar device 287a at the opposite end of the cutting member similarly acts upon the plate 271. The cutter is now forced across by the admission of air to the cylinder 262 through the line 255 and the stock is cut. The cutting unit then moves upward as indicated in Fig. 19, the devices 287 and 287a holding the angle plates down, guiding the plates 279 and 280 on to the upper taper of the cam 282, and relieving the tension on the stock. The stripper pins 269 and 270 now protrude through the corresponding orifices 277 and 278 and detach the stock from the angle plates. As the unit continues its upward movement, the pin 288 forces the arm 287 from the angle plate 286, and the plates 271 and 272 snap into their original position as shown in Fig. 20. This sudden movement of the angle plates serves to free the stock if it sticks to the pins 281. Fig. 20 is a section taken on the line 20—20 of Fig. 16 and shows the cutting knife in section. A set screw 300 is preferably provided in the under face of the angle plate 271 as shown in the enlarged section, Fig. 21, to adjust the unit to the particular stock being used.

*Bead cutting and applying mechanism*

When the conveyor and stock cutting mechanism have completed their cycle of operations the four plies 74—78 and the chafing strips 131 have been assembled in their proper arrangement and the slab thus formed has been cut to the proper length for the particular size of tire being manufactured. The edge portions of the plies 74 and 77 with chafing strips thereon are preferably turned up in the manner indicated in Fig. 24 to admit the beads. The conveyor belt 223 on which the last plying operation took place now advances the severed slab to the bead cutting and applying mechanism H.

Referring to Figs. 30 to 33, 40 and 41, the two beads 225 are fed to the machine from convenient sources of supply, each bead passing between guide rolls 325 and 326 and then between feed rolls 327 and 328. These beads travel along parallel paths and the mechanism for operating on each is the same. The feed rolls 328 are friction driven and the rolls 327 actuated by a chain 329 on sprockets 330 and 331. Clutches 332 are provided on the shaft 333 to automatically stop the corresponding feed rolls 327 when slack occurs in the beads. These clutches are controlled by corresponding rolls 334 mounted between pairs of arms 335 (Fig. 33) pivoted at one end on the shaft 333. The rolls 334 rest on the beads in the manner indicated and when they are lowered, due to slack in the beads, the corresponding clutches are disengaged and remain so until sufficient slack has been taken up to lift these rolls. In this way the beads are automatically fed to the mechanism as rapidly as required. The shaft 320 carrying roll 328 is provided with a non-return clutch 321 (Fig. 40) to permit the roll to rotate as the bead is advanced but to prevent backward movement of the beads. The beads continue over rolls 336, between rolls 337 and 338 and then between rolls 339 and 340, the rolls 340 being driven and the rolls 339 friction operated. Rollers 341 carry the beads from the bead cutting mechanism 342 to the stitching rolls 343 loose on the shaft. These rolls 343 may be of the gear type to prevent the stock piling up ahead of it as might occur with smooth rolls. The rolls 343a are fixed on the shaft 343b (Fig. 44) preferably kept in motion by belt 344 from the shaft 345 and the purpose of this is to eliminate the necessity of the slab doing any work in turning the stitching rolls, thus preventing the parts of the slab from piling up.

Triggers 363 are interposed in the path of the advancing beads near the rolls 358 and when these are tripped by the forward ends of the beads, levers 364, 356, 365 and 366 are actuated through rods 319 and 364a. Detent 354 is thereby disengaged from the spindle 351 permitting the rolls 339 and 340 to engage the beads. The beads are now advanced by the plied slab approximately one quarter of an inch, bringing them under tension, then levers 365 and 366 release detents 367. This delayed action of the detent 367 is secured by properly positioning adjusting nuts 319a on rod 319. As the detents 367 trip, knives 368 (Fig. 32) sever the beads while each is under tension. These knives are mounted on arms 369 and actuated by springs 370. The arms are connected to their respective knives by rounded tongue and groove joints as 371 which permit the arms to swing freely through the slight arc of travel.

On the shaft 347 (Fig. 30) is a nest of three cams 346, 346a and 346b which with cam 359 on the opposite end of the shaft (Fig. 31) control the bead cutting mechanism. The rotation of the shaft 347 is timed to synchronize with the measuring and cutting unit G so that there is one revolution of this shaft for each tire slab or cycle of operations. Cam 346a operates lever 346c which moves knives 368 outward to the position shown in Fig. 32. This removes the tension on springs 368a as they are attached to operating levers 369, thus allowing arm 364 and rod 319 to move to the right by gravity, which movement shifts detent 367 to engage blocks 367a, thereby holding the knives out against the tension of springs 370. Cam 346b operating through rocker arm 348, rod 349 and rocker 350 raises roller 339 from contact with the bead. Detent 354 engaging under shoulders 355 of spindle 351 holds rollers 339 out of operative relation with rollers 340 after the cam 346b has disengaged lever 348. Cam 346 operating through rocker arm 346d, rod 346e and rocker 346f lifts rollers 358 and holds them until the forward end of the tire assembly has passed this point. Cam 359 (Figs. 31 and 33) acting through pawl lever 360 controls the operation of the feed roll 340 through clutch 362, shown in detail in Fig. 41.

The slab to receive the beads on reaching station S is carried beneath the stitching rolls 343 and 343a by the conveyor belt 223 (Fig. 33), and these rolls stitch the bead and the attached flipper strip 343d respectively on the ply 76 in the manner indicated in Fig. 25. The roll 343 acts as a guide for the bead.

Immediately in rear of the rolls 343 and 343a are guides 343c extending inwardly over the path of their respective beads. These guides serve to turn the upstanding edges of the two top plies 75 and 77 and the chafing strips 131 over the flipper strips 343d where they are stitched by rollers 345a on shaft 345 at station T as shown in Figs. 26, 44 and 46.

At station X (Figs. 44, 47 and 26a) the upper plies are stitched into the bead clinch by roller 400, the bead being supported by roller 401. This action also serves to stitch the bead on ply 76 (Figs. 26a and 47).

Between stations X and Y are rollers 402 which serve to turn the outer edges of the plies 76 and 78 upwardly over the toe of the bead and stitch them to the bead as indicated in Fig. 27.

At station Y the upper plies are stitched over the top of the bead by rollers 403 and at station Z roller 358 completes the ply stitching by forcing the upper plies down as shown in Figs. 28 and 49.

The various rollers operating to fold and stitch the plies about the beads are actuated from the main drive shaft of unit G through shafts 405, 406 and 407 (Figs. 3 and 30).

In the operation of the bead cutting and applying mechanism, when a tire slab on the conveyor belt 223 approaches this mechanism, the rollers 339 are resting on beads 225 and the knives 368 are in their outward position. At the proper time the cam 359 disengages the pawl lever 360 from the clutch 362 and thereby permits this clutch to operatively connect the bead feeding rollers 340 with the driving mechanism. This feeds the beads toward the station S. After the leading ends of the beads have passed under rollers 343 and are attached to the slab, it is desirable to have them advanced by the slab rather than by the feed rollers. Cam 346b at this time acts to lift the rollers 339 out of contact with the beads and this removes the pressure of the bead against the rollers 340. When the leading ends of the beads approach station Z, the cam 359 acts to disengage the clutch 362 by permitting the pawl 360 to engage therewith, thereby stopping the rolls 340.

When the ends of the bead contact with the corresponding triggers 363 on lever 364, rod 319 shifts the rocker lever 356, disengaging detent 354 and permitting rollers 339 to drop upon the beads, and thus pressing them against the rollers 340 which are now stationary. Rod 319 proceeds further to the left and collar 319c strikes lever 365, disengaging detent 367 and permitting the knives to move inwardly under the action of the tension springs 370. The interval between the dropping of the rollers 339 and the swinging of the knives 368 due to inertia and the spacing of the collars on rod 319, is sufficient to permit the beads to be placed under tension, thereby making easy the action of the knives in cutting these beads. As the arms 369 swing inwardly they place the springs 368a under tension sufficiently to overcome the weight of the lever 364 and cause it to swing far enough to the left (Fig. 30) so that the triggers 363 are raised above the beads and tire slabs and no damage thereto can occur such as would be possible if these triggers were drawn over the slab. The revolution of the cams on the shaft 347 continues until the several parts are returned to their initial position, thus completing the cycle of operations.

The bead supply mechanism

While any suitable mechanism might be provided to supply the beads to the cutting and applying mechanism, an advantageous construction is illustrated in Figs. 34–36. The supply of bead stock is placed on discs as 425 supported on pedestals 425a. A flipper strip 343d has already been applied to the bead 225 in the usual manner.

After the beads leave the discs 425 a narrow strip of raw gum is preferably applied upon the free edge of the flipper strip as indicated at 426. This gum in rolls as 427 is initially provided with a cambric backing 431a as is customary to prevent the convolutions adhering. The backing is removed from the gummed strip by unit L. The beads are advanced by corresponding conveyor belts 428, driven from motor 428a by chain 428b, between coacting rolls 429 and 430 which apply the gummed strips to the beads and stitch them in place as indicated in Fig. 36. The conveyor belts 428 are preferably kept taut by adjusting blocks 428c.

The gummed strips with backing attached are drawn downwardly as indicated at 431 and pressed on the corresponding beads as they pass beneath the stitching rolls 429 and 430, the cambric backing 431a being on the upper face or that contacting with the roll 429. The backing is removed from the strip as it emerges from between the rolls and drawn upwardly around guide roll 432 by coacting rolls 433 and 434, the roll 433 being driven from the shaft of the roll 429 by a chain 435 and the roll 434, friction driven.

After this strip passes between the rolls 433 and 434, it is deposited in a waste receptacle 436 or otherwise disposed of.

The beads next preferably pass to take-up mechanism 437 which acts as a storage to compensate for intermittent operation either of the supply or the draft mechanisms. In the present embodiment this comprises a lower series of sheaves or pulleys 438, an upper series 439 and intermediate pulleys 440. The beads pass over pulleys 440, then successively under the pulleys 438 and over the pulleys 439. The pulleys 439 are mounted on a vertically slidable shaft 441 supported by counterweights 442 as is customary in such take-up mechanisms. From the last of the pulleys 439 the beads pass over the corresponding sheaves or pulleys 443 to the rolls 325 and 326 (Fig. 31), and then to the rolls 327 and 328 (Fig. 30) in the bead cutting and applying mechanism.

The tread applying mechanism

Upon the completion of the bead applying operation, the slab is finished except for the application of the tread. The tread applying mechanism, unit K, is shown in Figs. 38 and 39. The slab is advanced by the conveyor 223 which passes over pulley 475 mounted in the far end of the frame of the unit H, then over guide pulley 476 and under guide pulley 477. Above the pulley 475 is located a pulley 478 mounted in oppositely disposed supports 479 on the frame of the unit H. Corresponding supports 480 are provided at the far end of the frame 481 of the unit K and a pulley 482 is mounted in these supports. A tread conveying belt 483 operates upon the pulleys 478 and 482, the pulley 478 forming the driving element and being in turn driven from the shaft 487 by the pinion 486, the gear 485, the clutch 485a, a gear (not shown), and the gear 484. The main conveyor belt 223 is likewise driven from the shaft 487 through the medium of the gears 485 and 486. The shaft 487 is driven from the main drive shaft of unit G (Fig. 3) by shafts 405, 406, 407 and bevel gear 488.

A conveyor belt 489 beneath the conveyor 483 is driven from the shaft 487 through the medium of chain 490, sprockets 491 and 492, shaft 493, shaft 494, and pulley 495, shaft 493 being geared to the shaft 494. This conveyor 489 passes about idler pulley 496 at the outer end of frame 497 and is supported at intervals by rolls 498 in such frame. The conveyor 489 may be shifted to vary the elevation of the outer or discharge end thereof by the bolt and slot adjustment 499.

The cam 359 (Fig. 3) acts to release the ratchet clutch 485a (Fig. 38) to start the operation of the conveyor 483 by raising the pawl 500 through the medium of the rod 501 and lever 502. This allows the detent 503 on the pawl to seat on the lever 504 which is held by spring 505 with bracket 506 as fulcrum. The conveyor 483 continues to operate until the lever 504 is caused to disengage the detent 503 by the stop 507 on the conveyor acting to trip the trigger 508 connected to the lever by the rod 509. The trigger 508 is pivoted at 510 on a bracket 511 secured to the support 480. When the trigger 508 is tripped by the stop 507 the teeth on the free extremity of the pawl 500 engage the teeth on the clutch 485a, disengaging the clutch by preventing further rotation thereof and thus stopping the conveyor 483. The stopping of this conveyor occurs when a tread has been applied to a slab and the conveyor is in position to receive another tread for the next slab.

In the operation of the tread applying mechanism, the initial position of the parts is as indicated in Fig. 38. The tread to be applied to the advancing slab is placed longitudinally upon the uppermost portion of the conveyor 483 with its outside face down. A series of small pins as 515 on the outer face of this conveyor engage the tread and cause it to be positively advanced thereby. The operation of the conveyor belts 223 and 483 is synchronized so that the end of the tread enters between the rolls 475 and 478 at the same time as the forward end of the advancing slab. These rolls cause the tread to be stitched upon the slab. As the slab with tread attached leaves the stitching points it is disengaged from the roll 475 by a stripper 516 and deposited on the conveyor 489. This conveyor 489 carries the slab with attached tread forwardly and it is either lifted from this conveyor by the operator or passes off at the discharging end 517 of the conveyor. This completes the operation of the tire building apparatus forming the subject matter of the present invention. The finished slab is now ready to have its ends spliced to form what is generally termed a pulley band. The pulley band is then shaped to tire form by the vacuum or some other suitable method.

The apparatus in general

From the foregoing description it will be evident that the elements of the tire are completely assembled by the apparatus forming the subject matter of the present invention and all that remains to be performed is the splicing of the ends of the completed slab to form a "pulley band", the shaping of the pulley band to tire form, and the vulcanizing of the tire. While these additional steps form a continuation of the operation performed by the present apparatus, and the apparatus therefor might readily be linked therewith, it is usually preferable to operate the apparatus for accomplishing these finishing steps independently of the tire building operation.

As has been previously stated, the primary functions of the present invention are to reduce the cost of manufacturing tires, particularly of the clincher type, and the production of an improved article. The reduction in cost of manufacture is largely due to the elimination of manual labor and increase in production. Various forms of machines have heretofore been used to perform the individual steps in tire building but each of these has required the services of one or more operators and in addition thereto there has been the labor and loss of time involved in the transferring of the elements or partially assembled parts from one machine to another.

In the apparatus forming the present invention, manual labor is almost entirely dispensed with and the entire building of the tire slab is practically automatic. After the lengths of bias cut fabric are spliced on the tables to form continuous strips, the tire building proceeds entirely automatically. The strips are longitudinally divided to the proper width, superimposed, relieved of tension, cut to length, stitched, the beads applied, the plies turned and stitched about the beads, the beads cut to length, and the tread applied and stitched upon the assembled slab or carcass. After the fabric and other elements have been threaded through the apparatus, the tire building operation will continue indefinitely, the only labor required being the maintaining of the supplies of stock. The various steps are performed practically by a continuous movement. Absolute uniformity of article is provided and this cannot be obtained where the tire building depends wholly or largely upon the skill of the various operators. Uniformity of product is particularly important in a highly developed art such as tire building.

The apparatus requires relatively little space and is readily adjustable for different sizes of tires. While the present embodiments of the invention is intended for the building of tires of the clincher type, it will be readily appreciated that the same general principles would apply to the building of straight side tires and portions of the same apparatus could be utilized without change of form or mode of operation. The apparatus is also adaptable for use in the building of fabric tires as distinguished from the usual cord type. It will be appreciated that where it is not necessary or desirable to perform all the steps of the apparatus as a whole, certain portions thereof may be used.

Reviewing briefly the operation of the apparatus, the cord fabric in a continuous strip is fed to the bias cutting unit A from the supply roll 50 or other source. There it is cut into lengths of the required dimensions by an adjustable blade, the lengths being removed therefrom and placed upon splicing tables by the operators. In the present embodiment there are two of these tables and the cut lengths are placed alternately on tables 53 and 54, the lengths on their respective tables being spliced end to end to form continuous strips. In order that the cords in alternate plies may be angularly disposed as is customary, the lengths of bias cut fabric on one of these tables is inverted as indicated in Fig. 2. These strips are fed from their respective tables to the corresponding slitting unit C which divides the strip longitudinally. In the present embodiment each strip is divided into two strips of ply width as the tire to be built has a four ply carcass. Where more or less plies are required, the apparatus may be readily modified for this purpose, but the principles of construction and mode of operation would be the same.

After the continuous strips of cord fabric have been slit in the manner described, they are brought into superimposed relation by a series of guide rolls, the strips being brought in alternately from each of the tables so that the usual angular arrangement of cords is provided. Then the arranged strips enter the tension relieving mechanism or unit F where they are festooned on series of rollers in order that all tension may be removed from the fabric prior to the cutting of the strips to the required length for the particular size of tire being manufactured. After being thus cut, the plies are stitched together with the exception of the marginal portions of certain of the plies which as has been described are preferably left unstitched in order to permit bead strips being inserted therebetween. The measuring, cutting, and stitching takes place in the unit G. Simultaneous with the feeding of the strips of cord fabric to the tension relieving unit F, chafing strips are introduced in this unit and these are advanced to the unit G in proper relation above the marginal portions of the uppermost ply. These chafing strips are cut by the unit G to proper length and stitched upon such uppermost ply in the same manner as the plies are stitched. In view of the fact that it is desirable to have the chafing strips slightly longer than the plies, mechanism has been provided to procure the same.

The plied slabs with chafing strips attached pass from the unit G to the unit H where the beads are applied and the edges of the plies turned and stitched thereon. The beads in the form of a continuous strip enter this unit and are there cut to length as they are being applied. The turning and stitching of the plies about the beads is performed at a series of stations in this unit, each station performing one or more operations in the proper sequence.

On leaving the unit H the plied and beaded slab enters the unit K where the tread, previously cut to length, is applied. The slab is then completed and is discharged by this unit to be subsequently formed into a pulley band, shaped and vulcanized in the usual manner. The various units are preferably driven from a common source as for example the motor 196 beneath the unit G so that the timing of the various operations is properly synchronized and this applies particularly to units G, H and K. Where certain of the units operate intermittently and the adjacent units act continuously, take-up mechanisms are preferably provided to compensate therefor. Where the plies of the slab are of different width as is usually the case, this is provided by the proper arrangement of the guides relative to the cutting elements in the units C. Thus, the strip 75 may be either wider or narrower than the strip 76 and the same regarding the strip 77 and 78, and all of the strips may be varied in width for different sizes of tires. The adjustment for length of slab is secured by shifting the cutting elements in the unit G. No corresponding adjustment is necessary in the bead cutting unit as the operation of the cutting element therein is regulated by the slab receiving the beads.

Having thus described my invention, what I claim and desire to protect by Letters Patent is:

1. Apparatus for building pneumatic tires for vehicles comprising means for bias cutting fabric, means for dividing the cut fabric into a plurality of strips, means for arranging said strips in superimposed relation, means for cutting the strips into predetermined lengths, means for stitching the cut strips to form a slab, means for applying beads to the marginal portions of said slab, and means for applying treads on said slab.

2. Apparatus for building pneumatic tires for vehicles comprising means for longitudinally dividing a continuous strip of tire fabric into a plurality of strips of the required width, means for superimposing said strips, means for cutting said strips into predetermined lengths, means for stitching said cut strips to form a slab, means for applying beads to the marginal portions of the cut slab, and means for applying treads to the beaded slab.

3. Apparatus for building pneumatic tires of the clincher type comprising means for longitudinally dividing a continuous strip of fabric into a plurality of strips of the required width, means for arranging said strips in superimposed relation, means for stitching the superimposed strips to form a plied sheet, means for applying strips of bead material to the marginal portions of said sheet, and means for applying treads to said sheet.

4. In apparatus for building pneumatic tires, means for arranging a plurality of strips of fabric in superimposed relations, means for stitching the superimposed strips to form a plied sheet, and means for applying beads to the marginal portions of the sheet.

5. In apparatus for building pneumatic tires, means for arranging strips of fabric in superimposed relation, means for stitching said strips to form a plied sheet, and means for applying chafing strips to the marginal portions of said sheet.

6. In apparatus for building pneumatic tires, means for arranging strips of fabric in superimposed relation, means for stitching portions of said strips, but leaving the marginal portions of certain of said strips unstitched, and means for applying beads between the unstitched marginal portions.

7. In apparatus for building pneumatic tires, means for arranging strips of fabric in superimposed relation, means for stitching portions of said strips but leaving the marginal portions of certain of said strips unstitched, means for applying beads between the unstitched marginal portions of said strip, and means for stitching said marginal portions around said bead.

8. In apparatus for building tires in combination, means for applying beads to the marginal portions of a slab, and means for stitching the marginal portions over said beads.

9. In apparatus for building pneumatic tires, means including a conveyor for advancing a slab, means for applying beads to the marginal portions of said slab, and means for stitching said marginal portions over said beads.

10. In apparatus for building pneumatic tires, means including a conveyor for advancing a plied slab, means for applying bead strips to the marginal portions of said slab, means for cutting said bead strips to the required length, and means for folding and stitching certain of the plies of said slab over the cut beads.

11. In apparatus for building pneumatic tires, means for arranging a plurality of strips of cord fabric in superimposed relation, means for relieving the tension of the superimposed strips, means for cutting each of said strips to the required length, and means for stitching the cut strips to form a plied slab.

12. In apparatus for building tires in combination, means for arranging a plurality of strips of fabric in superimposed relation, means for relieving the tension of the strips, and means for cutting each of the strips to a predetermined length.

13. In apparatus for building pneumatic tires, a slitting device for longitudinally dividing a sheet of bias cut cord fabric into a plurality of strips of the required width, means for inverting certain of said strips, means for arranging said strips in superimposed relation with the inverted strips alternating with the strips not inverted, and means for festooning said strips while in said relation to relieve the tension therein.

14. In apparatus for building pneumatic tires, a slitting device for longitudinally dividing a sheet of bias cut cord fabric into a plurality of strips of the required width, means for arranging said strips in superimposed relation with the alternate strips inverted, means for individually festooning said strips to relieve the tension therein, means for drawing the strips from said festooning means, and means for severing the predetermined lengths from each of said strips.

15. In apparatus for building pneumatic tires, a slitting device for longitudinally dividing a sheet of bias cut cord fabric into a plurality of strips of the required width, means for arranging said strips in superimposed relation with the alternate strips inverted, means for individually festooning said strips to relieve the tension therein, means for drawing the strips from said festooning means, and means for obliquely severing the predetermined lengths from each of said strips.

16. In apparatus for building pneumatic tires, means for arranging a plurality of strips of fabric in superimposed relation, and means for obliquely severing predetermined lengths from said strips while in said relation, the lines of cutting in alternate strips being angularly disposed.

17. In apparatus for building pneumatic tires, means for aligning a plurality of strips of bias cut fabric in superimposed relation with the direction of the cords in alternate strips angularly disposed, means for cutting said strips from a single sheet of fabric, and cutting members movable obliquely of said strips for severing therefrom predetermined lengths.

18. In apparatus for building pneumatic tires, means for maintaining a plurality of strips of fabric in superimposed spaced relation, cutting members movable obliquely of said strips for severing therefrom predetermined lengths, and means for stitching the cut lengths to form a plied slab.

19. In apparatus for building tires in combination, means for applying beads to a slab, and means for applying a tread to the slab.

20. In apparatus for building pneumatic tires, means for advancing a plied slab, means for applying beads to the marginal portions of said slab, and means for applying and stitching a tread upon the beaded slab.

21. In apparatus for building pneumatic tires, means for superimposing a plurality of strips of tire fabric, means for stitching the central portions of the superimposed strips leaving the marginal portions thereof unstitched, means for separating the marginal portions of certain of said strips to admit beads therebetween, means for inserting said beads between the separated marginal portions, and means for folding and stitching said marginal portions about said beads including a conveyor for advancing the plied stock, and series of rolls disposed along the path of said conveyor and acting successively on said stock as it is moved thereby on said conveyor.

22. In apparatus for building pneumatic tires, a festooning device for removing the tension from a strip of fabric, including supporting members extending transversely of the strip at longitudinal intervals, reciprocating members disposed opposite the interval between said supporting members, said reciprocating members being disposed adjacent one side of the strip, and means for alternately moving said reciprocating members into and out of engagement with said strip to form the festoons.

23. In apparatus for building pneumatic tires, a festooning device for removing the tension from a strip of fabric including substantially horizontal supporting rolls extending transversely of the strip at longitudinal intervals and over which the strip is drawn, and a vertically reciprocating roll opposite the interval between each pair of supporting rolls, said reciprocating rolls being disposed above the strip and means for moving said rolls downwardly through the corresponding intervals between the supporting rolls to form festoons and then withdrawing said rolls from said festoons.

24. In apparatus for building pneumatic tires, a festooning device for relieving the tension in a plurality of strips of fabric arranged in superimposed and spaced relation including a fixed frame, a plurality of series of strip supporting rolls revolubly mounted in said frame with one series disposed beneath each of said strips, and the individual rolls of the series extending transversely of the corresponding strip at longitudinal intervals, a vertically shiftable frame, a series of rolls revolubly mounted in said shiftable frame with one roll of said series disposed above each of said strips opposite the interval between the corresponding supporting rolls, and means for actuating said shiftable frame to move the rolls carried thereby downwardly through said intervals to form the festoon, and then upwardly out of the formed festoon.

25. In apparatus for building pneumatic tires, a festooning device for relieving the tension in a plurality of strips of fabric arranged in superimposed and spaced relation, comprising a fixed frame, a plurality of series of strip supporting rolls revolubly mounted in said frame with one series disposed beneath each of said strips and the individual rolls of the series extending transversely of the strip at longitudinal intervals, a plurality of spaced upright frames shiftable vertically, each of said shiftable frames having a series of rolls revolubly mounted therein with one roll disposed above each of said strips opposite the interval between the corresponding supporting rolls, and means for individually actuating said shiftable frames to move the rolls thereon downwardly through said intervals to form the festoons in the strips and then upwardly out of the formed festoon.

26. In apparatus for building pneumatic tires, a festooning device for relieving the tension in a plurality of strips of fabric arranged in superimposed and spaced relation, comprising a fixed frame, a plurality of series of strip supporting rolls revolubly mounted in said frame with one series disposed beneath each of said strips and the individual rolls of the series extending transversely of the strip at longitudinal intervals, a plurality of spaced upright frames shiftable vertically, each of said shiftable frames having a series of rolls revolubly mounted therein with one roll disposed above each of said strips opposite the interval between the corresponding supporting rolls, means for individually actuating said shiftable frames to move the rolls thereon downwardly through said intervals to form the festoons in the strips and then upwardly out of the formed festoon, and brake mechanism engaging each of said strips near the discharge end of said festooning device to restrict the movement thereof during the festooning operation.

27. In apparatus for building pneumatic tires, means for arranging a plurality of strips of fabric in superimposed relation, means for festooning the arranged strips to relieve the tension therein, means for cutting said strips into predetermined lengths, and means for stitching the cut strips to form a plied slab.

28. In apparatus for building tires in combination, means for applying beads to a slab, and means for cutting said beads to the proper length.

29. In apparatus for building pneumatic tires, means for advancing a slab, means for applying bead strips to the marginal portions of the advancing slab, and means for severing said bead strips when sufficient lengths have been received by said applying means.

30. In apparatus for building tires in combination, means for applying beads to a slab, means for cutting said beads to proper length, and means for placing the beads under tension during the cutting operation.

31. In apparatus for building tires in combination, means for supplying strips of fabrics, the cords of various strips being disposed at different angles with respect to the length of the fabric, means for slitting the strips into strips of proper width, and means for arranging the last mentioned strips in superimposed relation.

32. In apparatus for building tires in combination, means for supplying strips of fabric of predetermined length, means for stitching said strips together to form a slab, and means for applying a tread to the slab.

33. In apparatus for building tires in combination, means for supplying strips of fabric of predetermined length, means for stitching said strips together to form a slab, and means for applying beads to the slab.

34. In apparatus for building tires in combination, means for supplying strips of fabric of predetermined length, means for stitching the strips together to form a slab, means for applying beads to the slab, and means for applying a tread to the slab.

35. In a slab assembling device in combination, means for advancing strips of fabric, means for cutting said strips in lengths corresponding to the length of the slab, and means for stitching the cut strips together to form a slab.

36. A device for manipulating fabric comprising a travelling belt having apertures therethrough, and means for effecting a suction through the apertures.

37. A device for assembling plied sheets of fabric comprising in combination, means for advancing sheets of fabric, and suction means for transporting said strips into contiguous relation.

38. In a tire building machine in combination, means for advancing a flat slab having beads positioned at its margins, and means for stitching the margins of the slab about the beads.

39. In a tire building machine in combination, means for supplying a slab of sheet fabric having the marginal portions of some sheets displaced from the marginal portions of other sheets, and beads placed between said marginal portions, and means for stitching said marginal portions about said beads.

40. In apparatus for building pneumatic tires, means for advancing a slab, means for applying bead strips to the marginal portions of the advancing slab, means for severing said bead strips when sufficient lengths have been provided to said applying means, and means for placing the bead strips under tension during the severing operations.

41. In apparatus for building pneumatic tires, a conveyor for advancing a slab, means for applying beads to the marginal portions of the advancing slab, cutter members movable transversely of the path of the slab for severing the bead strip, and means controlled by the movement of said slab for actuating said cutter members.

42. In apparatus for building pneumatic tires, a conveyor for advancing a slab, means for applying bead strips to the marginal portions of the advancing slab, cutter members movable transversely of the path of the slab for severing the bead strips, means controlled by the movement of the slab for actuating said cutter members, and means for placing said bead strips under tension during the operation of said cutter members.

43. In apparatus for building pneumatic tires, a conveyor for advancing a slab, means for applying bead strips to the marginal portions of the advancing slab, cutter members movable transversely of the path of the slab for severing the bead strips, and means controlled by the movement the slab for actuating said cutter members, and temporarily holding the advance of the slab during such actuation.

44. A device for supplying strip material which comprises a pair of spaced supports over which the strip is passed, means to engage the material and means to move said material engaging means to draw the material under tension into a loop between the supports and to return the material engaging means to its initial position to free the looped material from tension.

45. A device for supplying strip material which comprises a pair of rolls over which the material is passed from a source of supply, means to engage the material intermediate said rolls and means to move said material engaging means to draw the material under tension into a loop and to return the material engaging means to initial position to leave the material in freely suspended loop form between the rolls.

ADRIAN O. ABBOTT, JR.